(12) United States Patent
Hsu et al.

(10) Patent No.: US 8,914,194 B2
(45) Date of Patent: Dec. 16, 2014

(54) STIMULUS-BASED STEERING SENSOR DEVICE AND METHOD FOR THE SAME

(75) Inventors: Jin-Yan Hsu, Changhua County (TW); Tsung-Hua Hsu, Changhua County (TW); Chau-Chih Yu, Changhua County (TW); Tsung-Hsien Hu, Changhua County (TW); Chih-Jung Yeh, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 211 days.

(21) Appl. No.: 13/567,408

(22) Filed: Aug. 6, 2012

(65) Prior Publication Data

US 2013/0332031 A1 Dec. 12, 2013

(30) Foreign Application Priority Data

Jun. 7, 2012 (TW) .............................. 101120528 A (51) Int. Cl.
*B62D 11/00* (2006.01)
*B62D 6/10* (2006.01)
*B62D 15/02* (2006.01)
*G01D 5/20* (2006.01)

(52) U.S. Cl.
CPC ............. *B62D 6/10* (2013.01); *B62D 15/0215* (2013.01); *G01D 5/2053* (2013.01)
USPC ............................................. 701/41; 701/42

(58) Field of Classification Search
CPC ..... B62D 15/0215; B62D 6/10; G01D 5/2053
USPC .................. 701/41–42; 73/862.326; 180/429
See application file for complete search history.

(56) References Cited

U.S. PATENT DOCUMENTS

| 2003/0056606 A1* | 3/2003 | Matsuura et al. ......... 73/862.191 |
| 2006/0021822 A1* | 2/2006 | Yamamoto ..................... 180/446 |
| 2011/0061962 A1* | 3/2011 | Sy et al. ....................... 180/400 |

FOREIGN PATENT DOCUMENTS

TW 201124699 7/2011

* cited by examiner

*Primary Examiner* — Helal A Algahaim
*Assistant Examiner* — Nga X Nguyen
(74) *Attorney, Agent, or Firm* — Muncy, Geissler, Olds & Lowe, P.C.

(57) ABSTRACT

A stimulus-based steering sensor device and a method for the same are disclosed. The sensor device comprises at least one driving wheel, a processor, two driven wheels, and two resolvers. The processor generates a stimulus signal and has a signal-angle lookup table. The driving wheel contacts two driven wheels. When following the rotation of a steering column, the driving wheel drives two driven wheels to rotate at different speeds. Two resolvers connect with the processor, respectively engage with two driven wheels, receive the stimulus signal, and respectively output two first sinusoidal signals to the processor according to the rotational speeds of two driven wheels. The processor analyzes two first sinusoidal signals to obtain two second sinusoidal signals having different periods, and uses the second sinusoidal signals and the signal-angle lookup table to obtain a first absolute angle value of the rotation of the steering wheel.

16 Claims, 10 Drawing Sheets

STIMULUS-BASED STEERING SENSOR DEVICE AND METHOD FOR THE SAME

BACKGROUND OF THE INVENTION

1. Field of the Invention

The present invention relates to a sensor technology, particularly to a stimulus-based steering sensor device and a method for the same.

2. Description of the Related Art

The automobile is an electromechanical device controlled by the driver. Especially, the throttle and the steering system of an automobile must be controlled by the driver. Normally, the driver interacts with the throttle system and the steering system through the accelerator pedal and the steering wheel. Sometimes, the driver controls an automobile through a throttle controller and a steering controller, which can respectively measure the pedaling activity and the steering activity of the driver. The pedaling activity and the steering activity will cause the related shafts to rotate. An angle sensor device can measure the rotation angle of the related shaft and learn the extent of the pedaling or steering activity. A dedicated microcomputer can use the measurement results to physically control the automobile or assist the driver in controlling the automobile. Therefore, the angle sensor plays a very important role in automobiles.

The conventional angle sensors may be categorized into the contact type, the magnetic type and the resolver type. The contact type angle sensor is likely to wear in operation and hard to maintain its precision after long-term use. Besides, the operation of a contact type angle sensor needs an angle analysis program and is pretty complicated. The magnetic type angle sensor needs a magnet whose source and reliability is not always guaranteed. The current resolvers are normally used to detect the electrical angle of a motor or a single-revolution angle. No current resolver is used to detect a multi-revolution angle. A Taiwan patent of publication No. 201124699 disclosed a technology that uses two resolvers whose magnetic pole numbers are prime number to each other to measure angles, wherein the relationship between the mechanical angle and the variation of the electrical angle is used to implement angle conversion, whereby is obtained a real mechanical angle. However, the prior art cannot measure a multi-revolution angle but can only detect a single-revolution angle. Besides, very few current angle sensors incorporate a torque detection function needed by the emerging EPS (Electric Power Steering) system.

Accordingly, the present invention proposes a stimulus-based steering sensor device and a method for the same to overcome the abovementioned problems.

SUMMARY OF THE INVENTION

The primary objective of the present invention is to provide a high-stability, high-precision and high-weatherability stimulus-based steering sensor device and a method for the same, which use at least one driving wheel to drive two driven wheels to rotate at different speeds so as to make two resolvers generate sinusoidal signals with different periods, whereby to obtain a multi-revolution absolute angle, the torque direction and the torque value of the rotation of a steering wheel.

To achieve the abovementioned objective, the present invention proposes stimulus-based steering sensor device, which comprises two driving wheels, a processor, two driven wheels, and two resolvers. Two driving wheels are installed on a steering column of a steering wheel. The processor generates a stimulus signal and has a signal-angle lookup table and a signal-differential torque lookup table. Two driving wheels respectively contact two driven wheels. When following the rotation of the steering column, two driving wheels respectively drive two driven wheels to rotate at different speeds. Two resolvers connect with the processor and respectively engage with two driven wheels. The resolvers receive the stimulus signal and respectively output two first sinusoidal signals to the processor according to the rotational speeds of two driven wheels. The processor analyzes two first sinusoidal signals to obtain two second sinusoidal signals, and uses the second sinusoidal signals, the signal-angle lookup table, and the signal-differential torque lookup table to obtain a first angle value, a torque direction and a torque value of the rotation of the steering wheel.

The present invention also proposes a stimulus-based steering sensing method, which comprises steps: two driving wheels, which are installed on a steering column of a steering wheel, following the rotation of the steering column and driving two driven wheels to rotate at different speeds; two resolvers receiving a stimulus signal and respectively outputting two first sinusoidal signals to a processor according to the rotational speeds of two driven wheels; the processor analyzing two first sinusoidal signals to obtain two second sinusoidal signals having different periods, and using the second sinusoidal signals, a signal-angle lookup table, and a signal-differential torque lookup table to obtain a first angle value, a torque direction and a torque value of the rotation of the steering wheel.

Below, embodiments are described in detail in cooperation with drawings to make easily understood the technical contents and accomplishments of the present invention.

DETAILED DESCRIPTION OF THE INVENTION

The more sophisticated the vehicular safety system, the more sensor devices a vehicle is equipped with. It is expected that there will be more and more steering-intervention safety systems among the future vehicular safety systems. The angular signal of the steering wheel is an important parameter in the steering-intervention safety systems. Therefore, it is necessary to develop an absolute angle sensor having high reliability, high stability and high weatherability.

Figure 1:
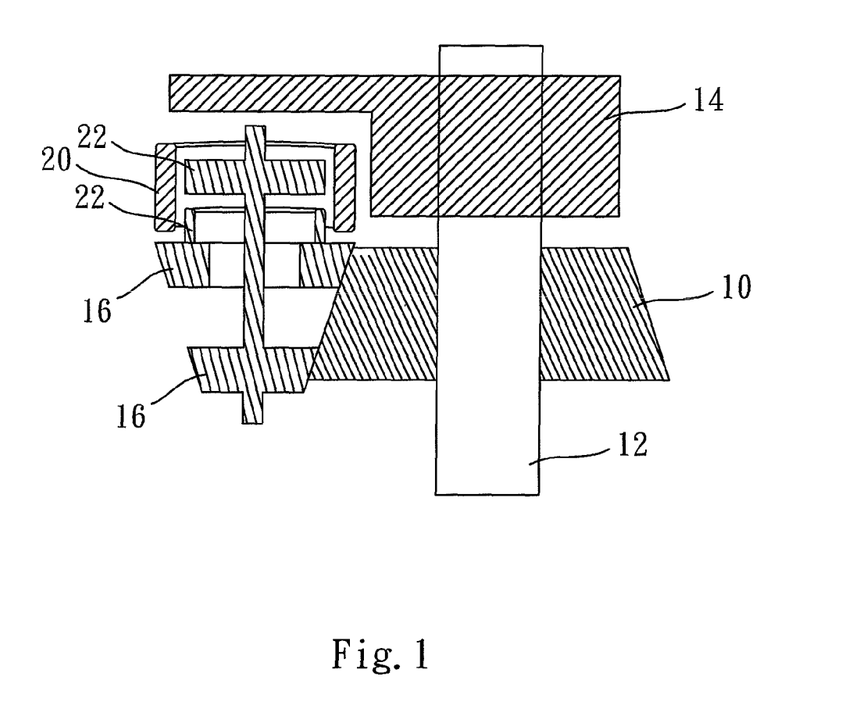
FIG. 1 schematically shows the structure of a stimulus-based steering sensor device according to a first embodiment of the present invention.
Figure 2:
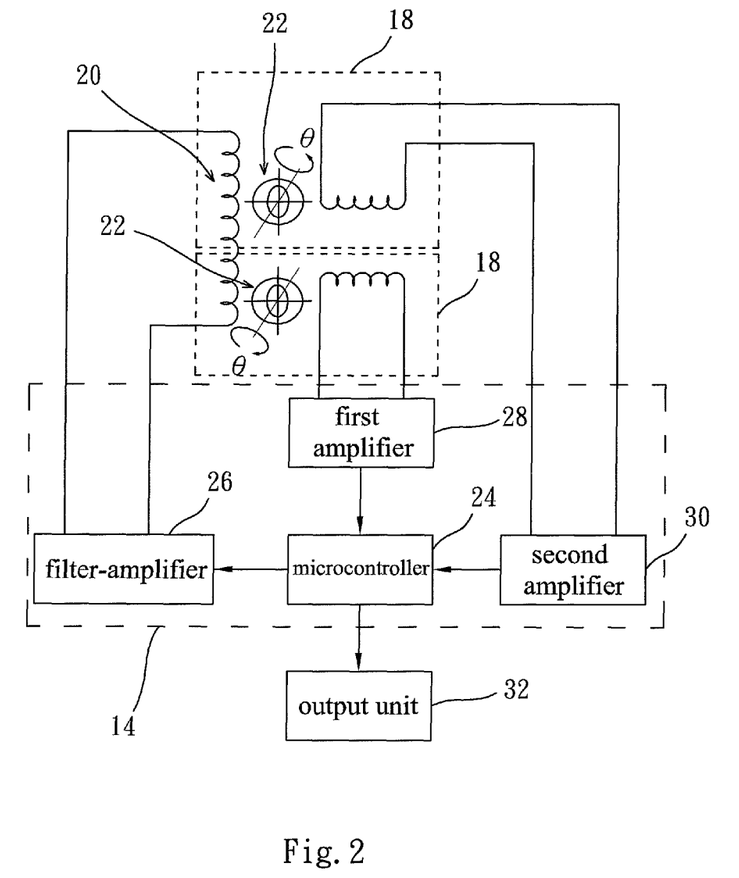
FIG. 2 schematically shows the circuitry of a stimulus-based steering sensor device according to the first embodiment of the present invention.
Figure 3A:
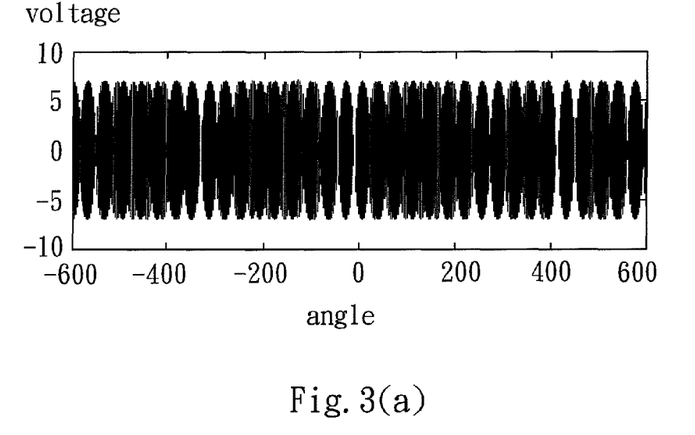
FIG. 3(a) shows the waveforms of a first sinusoidal signals of a stimulus-based steering sensor device according to the first embodiment of the present invention.
Figure 3B:
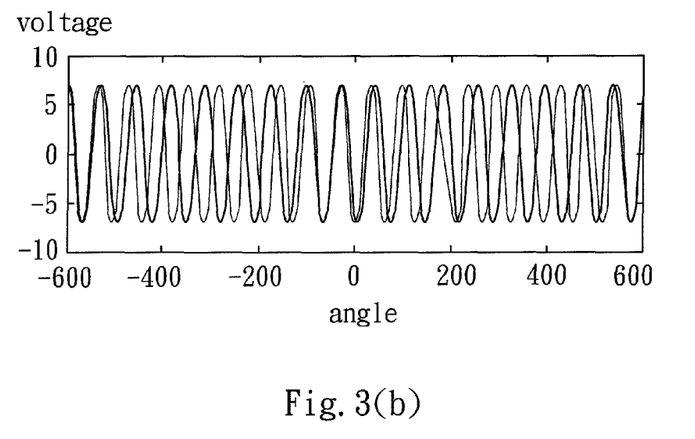
FIG. 3(b) shows the waveforms of a second sinusoidal signals of a stimulus-based steering sensor device according to the first embodiment of the present invention.

Refer to FIG. 1, FIG. 2, FIG. 3(a) and FIG. 3(b). In a first embodiment, the stimulus-based steering sensor device of the present invention comprises at least one driving wheel 10, a processor 14, two driven wheels 16 and two resolvers 18. The driving wheel 10 is installed on a steering column 12. In the first embodiment, there is one driving wheel 10. The processor 14 generates a stimulus signal and has a signal-angle lookup table. The driving wheel 10 contacts two driven wheels 16. When rotating together with the steering wheel and the steering column 16, the driving wheel 10 drives the two driven wheels 16 to rotate at different speeds. The processor 14 connects with two resolvers 18. The rotors 22 of the two resolvers 18 may be of the same specification, i.e. the two resolvers 18 have an identical magnetic pole number. Two resolvers 18 respectively engage with two driven wheels 16. Thereby, the driving wheel 10, the processor 14, two driven wheels 16 and two resolvers 18 form a modularized structure. Two resolvers 18 receive the stimulus signal and respectively output two first sinusoidal signals to the processor 14 according to the rotational speeds of the two driven wheels 16. The waveforms of the first sinusoidal signals is shown in FIG. 3(a). The processor 14 analyzes the two first sinusoidal signals and obtains two second sinusoidal signals respectively having different periods, as shown in FIG. 3(b). Thus, a first absolute angle value of the rotation of the steering wheel can be obtained from the signal-angle lookup table.

Two resolvers 18 include at least one stator 20 and two rotators 22. In the embodiment shown in FIG. 1, there is one stator 20. The stator 20 connects with the processor 14. Two rotators 22 are arranged between the primary side and the secondary side of the stator 20. Two rotators 22 engage with two driven wheels 16 and rotate with the two driven wheels 16. The stator 20 receives the stimulus signal and outputs two first sinusoidal signals according to the electromagnetic inductions generated by the two rotators 22 that respectively follow the rotations of two driven wheels 16.

The processor 14 includes a microcontroller 24 having a built-in signal-angle lookup table and generating a PWM (Pulse Width Modulation) signal. A filter-amplifier 26 connects with the microcontroller 24 and the stator 20 of two resolvers 18, receiving, filtering and amplifying the PWM signal to output the stimulus signal. The microcontroller 24 and the common stator 20 of two resolvers 18 connect with a first amplifier 28 and a second amplifier 30. The first amplifier 28 and the second amplifier 30 respectively receive the first sinusoidal signals, perform the gain transfer of the first sinusoidal signals, and outputs the scaled first sinusoidal signals to the microcontroller 24, whereby the microcontroller 24 can filter out the carrier waves of two first sinusoidal signals and obtain two second sinusoidal signals. The microcontroller 24 obtains a first absolute angle value, using the second sinusoidal signals and the signal-angle lookup table. An output unit 32 connects with the microcontroller 24 of the processor 14 and outputs the first absolute angle value. The output unit 32 may be CAN (Controller Area Network), an analog output module, UART (Universal Asynchronous Receiver/Transmitter), or a serial bus interface (such as SPI (Serial Peripheral Interface) or I$^2$C (Inter-Integrated Circuit).

Figure 4:
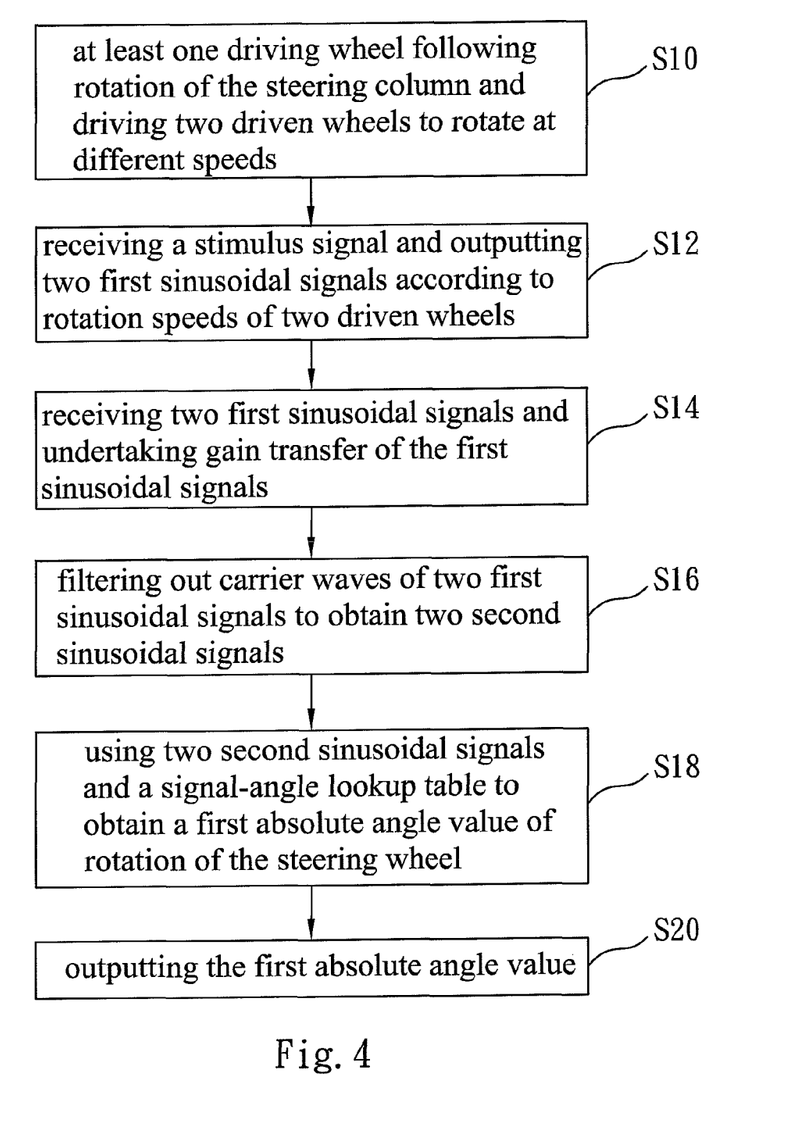
FIG. 4 shows the flowchart of a stimulus-based steering sensing method according to the first embodiment of the present invention.

Below is introduced a stimulus-based steering sensing method according to the first embodiment of the present invention. Refer to FIG. 1, FIG. 2 and FIG. 4. In Step S10, a driving wheel 10 follows the rotation of a steering column 12 and drives two driven wheels 16 to rotate at different speeds. Next, in Step S12, a stator 20 of two resolvers 18 receives a stimulus signal and outputs two first sinusoidal signals according to the electromagnetic inductions, which are generated by two rotators 22 following the rotations of two driven wheels 16. Next, in Step S14, a first amplifier 28 and a second amplifier 30 respectively receive the first sinusoidal signals, undertake gain transfer of the first sinusoidal signals, and output the scaled first sinusoidal signals to a microcontroller 24. Next, in Step S16, the microcontroller 24 filters out the carrier waves of two scaled first sinusoidal signals and obtains two second sinusoidal signals. Next, in Step S18, the microcontroller 24 uses the second sinusoidal signals and a signal-angle lookup table to obtain a first absolute angle value. Then, in Step S20, an output unit 32 outputs the first absolute angle value, which is used in a vehicular steering system. The present invention can detect an absolute angle, using merely two resolvers and the deceleration mechanism formed by two driven wheels. In the present invention, the detection range of the angle of the steering wheel can be regulated via modifying the gear ratio of the deceleration mechanism. The present invention does not use complicated structure or complicated programs. Further, the present invention is exempted from abrasion and special materials. Therefore, the present invention has high stability, high precision and high weatherability.

In one embodiment, it is alternatively undertaken in Step S14 and Step S16 that the processor 14 directly receives and analyzes two first sinusoidal signals to obtain two second sinusoidal signals respectively having different periods.

Figure 5:
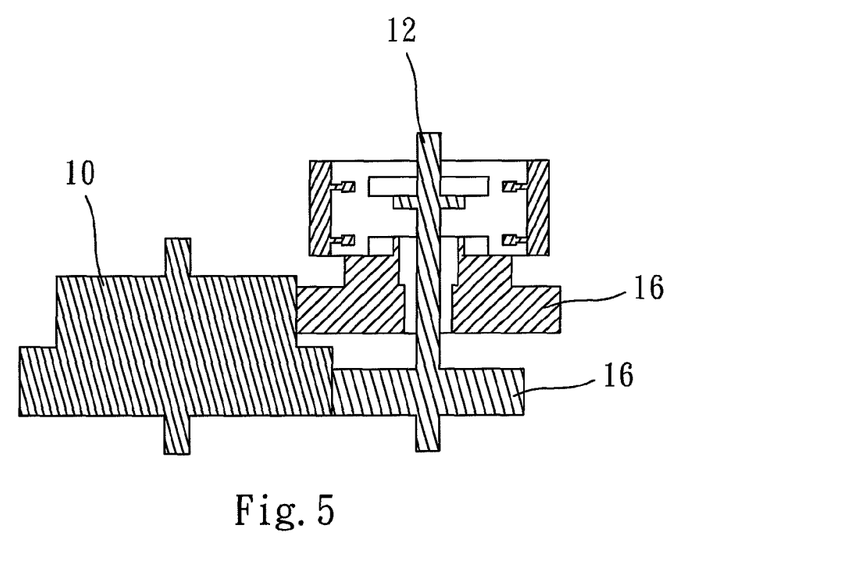
FIG. 5 schematically shows the structure of a driving wheel and two driven wheels respectively having different diameters according to the first embodiment of the present invention.
Figure 6:
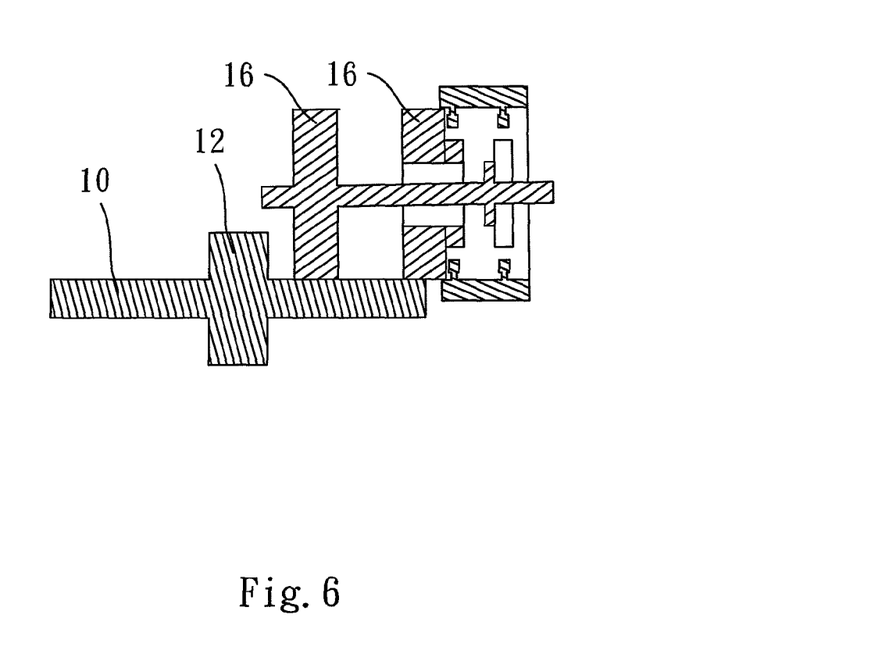
FIG. 6 schematically shows the structure of a driving wheel and two driven wheels in form of planar wheels according to the first embodiment of the present invention.

In the first embodiment, the driving wheel 10 and two driven wheels 16 may be gears, friction wheels, or planar wheels. When the driving wheel 10 and two driven wheels 16 are gears, the tooth faces of the driving wheel 10, which contact driven wheels 16, respectively have different numbers of teeth. As shown in FIG. 5, in the driving wheel 10, the tooth face having a greater diameter has more teeth, and the tooth face having a smaller diameter has less teeth. Thus, two driven wheels 16 rotate at different speeds. When the driving wheel 10 and two driven wheels 16 are friction wheels, the driven wheels 16 respectively have different diameter ratios with respect to the driving wheel 10 and thus rotate at different speeds. When the driving wheel 10 and two driven wheels 16 are planar wheels, the positions where two driven wheels 16 contact the driving wheel 10 have different distances to the center of the driving wheel 10, as shown in FIG. 6. Thus, two driven wheels 16 respectively rotate at different speeds.

Figure 7:
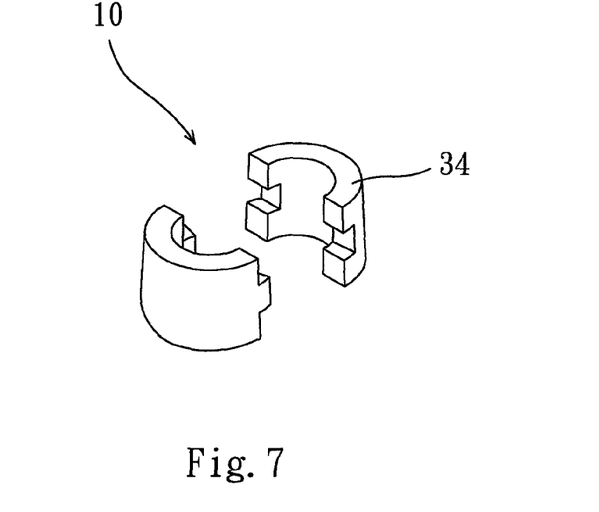
FIG. 7 is an exploded view of a driving wheel according to the first embodiment of the present invention.

In order to increase the convenience of assembling the driving wheel 10, the driving wheel 10 is designed to be separable in one embodiment of the present invention, wherein the driving wheel 10 is split into two half-wheels 34, as shown in FIG. 7. The half-wheels 34 are assembled to the steering column and engaged with each other with the steering column positioned between them.

Figure 8:
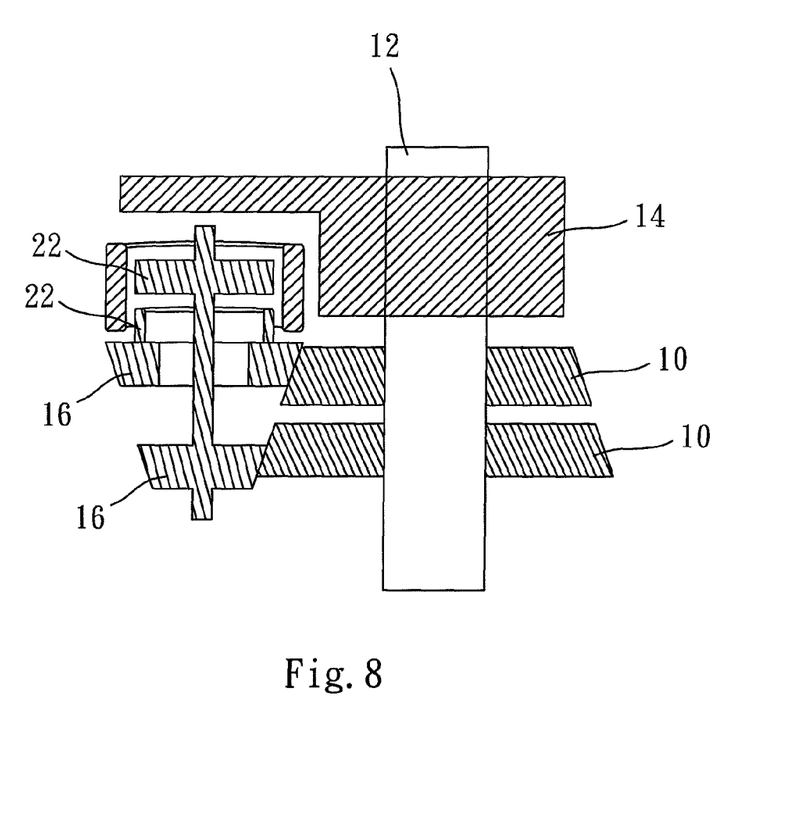
FIG. 8 schematically shows the structure of a stimulus-based steering sensor device according to a second embodiment of the present invention.
Figure 10:
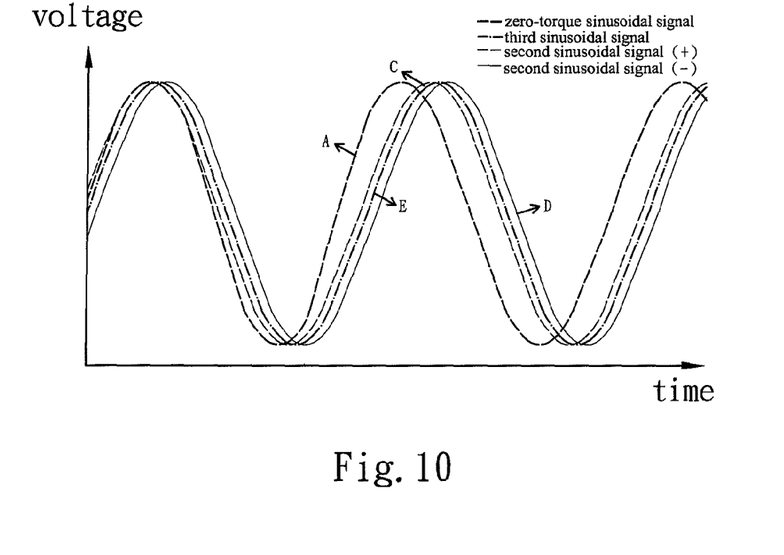
FIG. 10 shows the waveforms of zero-torque sinusoidal signals, third sinusoidal signals and second sinusoidal signals according to the second embodiment of the present invention.

It is a trend for the automobile industry to adopt the electric power steering (EPS) system. In a second embodiment, the torque detection function and the angle detection function are incorporated in the steering sensor device of the present invention, whereby the manufacturers using the present invention can promote the competitiveness thereof. Refer to FIG. 2, FIG. 8 and FIG. 10. Below is introduced the second embodiment of the present invention.

Figure 9:
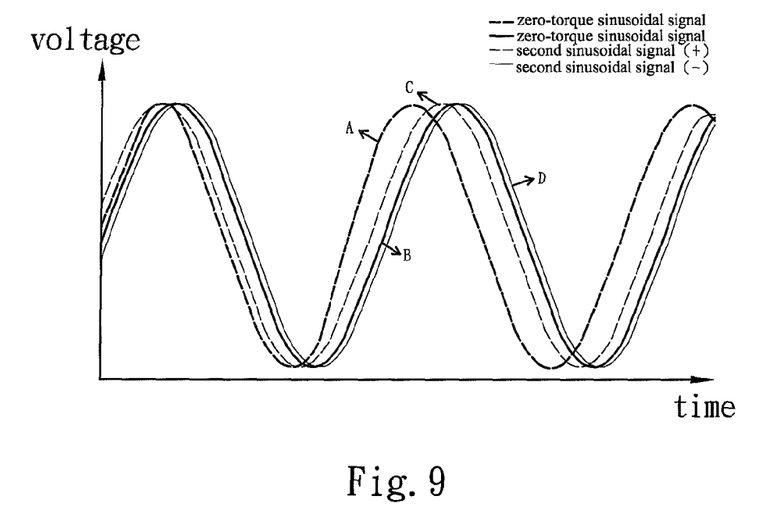
FIG. 9 shows the waveforms of zero-torque sinusoidal signals and second sinusoidal signals according to the second embodiment of the present invention.

The second embodiment is different from the first embodiment in that the steering sensor device has two driving wheels 10 respectively contacting the driven wheels 16. In the second embodiment, the processor 14 generates a stimulus signal and has a signal-angle lookup table and a signal-differential torque lookup table. The driving wheels 10 follow the rotation of the steering wheel and the steering column 12 and drive the driven wheels 16 to rotate at different speeds. The processor 14 connects with two resolvers 18. The two resolvers 18 may be of the same specification, i.e. the two resolvers 18 have an identical magnetic pole number. Two resolvers 18 respectively engage with two driven wheels 16. Thereby, the driving wheels 10, the processor 14, two driven wheels 16 and two resolvers 18 form a modularized structure. Two resolvers 18 receive the stimulus signal and respectively output two first sinusoidal signals to the processor 14 according to the rotational speeds of the two driven wheels 16. The processor 14 uses the signal-angle lookup table to obtain two zero-torque sinusoidal signals corresponding to a second absolute angle value, and finds out the difference between two second sinusoidal signals and two zero-torque sinusoidal signals. Then, the processor 14 uses the difference and the signal-differential torque lookup table to obtain the value and direction of the rotation torque of the steering wheel. Refer to FIG. 9, wherein + and − denote the directions of the torque. After the torque is applied to two second sinusoidal signals, the phase change occurs in one second sinusoidal signal and a zero-torque sinusoidal signal B. The resultant second sinusoidal signal is like the sinusoidal signal C or the sinusoidal signal D, and the value and direction of the phase change correlates with the value and direction of the torque. Applying torque does not vary the phase of the other second sinusoidal signal, and the other second sinusoidal signal coincides with the zero-torque sinusoidal signal A. It is observed in FIG. 9 that there is difference in voltage and phase for the second sinusoidal signals C and D and the zero-torque sinusoidal signal B after torque is applied.

Refer to FIG. 10. The processor 14 generates two third sinusoidal signals A and E via eliminating the torque information from two second sinusoidal signals according to the direction and value of the torque. Next, the processor 14 uses two third sinusoidal signals and the signal-angle lookup table to obtain a first absolute angle value and records the first absolute angle value. Besides, the second absolute angle value is a preset value or the first absolute angle value recorded latest.

The structure and operation of two resolvers 18 of the second embodiment is the same as that of the first embodiment and will not repeat herein.

The processor 14 includes a microcontroller 24. The microcontroller 24 has a built-in signal-angle lookup table and a built-in signal-differential torque lookup table and generates a PWM signal. A filter-amplifier 26 connects with the microcontroller 24 and the stator 20 of two resolvers 18, receives, filters and amplifies the PWM signal to output a stimulus signal. Further, a first amplifier 28 and a second amplifier 30 connect with the microcontroller 24 and the stator 20 of two resolvers 18. The first amplifier 28 and the second amplifier 30 respectively receive two first sinusoidal signals, perform gain transfer thereof, and output the scaled first sinusoidal signals to the microcontroller 24. The microcontroller 24 filters out the carrier waves of two first sinusoidal signals to obtain two second sinusoidal signals. The microcontroller 24 uses the signal-angle lookup table to obtain two zero-torque sinusoidal signals corresponding to a second absolute angle value, and finds out the difference between two second sinusoidal signals and two zero-torque sinusoidal signals. Then, the microcontroller 24 uses the difference and the signal-differential torque lookup table to obtain the value and direction of the rotation torque of the steering wheel. Next, the microcontroller 24 removes the torque information from two second sinusoidal signals according to the direction and value of the torque so as to generate two torque-free third sinusoidal signals. Next, the microcontroller 24 uses two third sinusoidal signals and the signal-angle lookup table to obtain a first absolute angle value of the rotation of the steering wheel and records the first absolute angle value. Besides, the second absolute angle value is a preset value or the first absolute angle value recorded latest. An output unit 32 connects with the microcontroller 24 and outputs the first absolute angle value, the value and direction of torque. The output unit 32 may be CAN (Controller Area Network), an analog output module, UART (Universal Asynchronous Receiver/Transmitter), or a serial bus interface (such as SPI (Serial Peripheral Interface) or I²C (Inter-Integrated Circuit).

Figure 11:
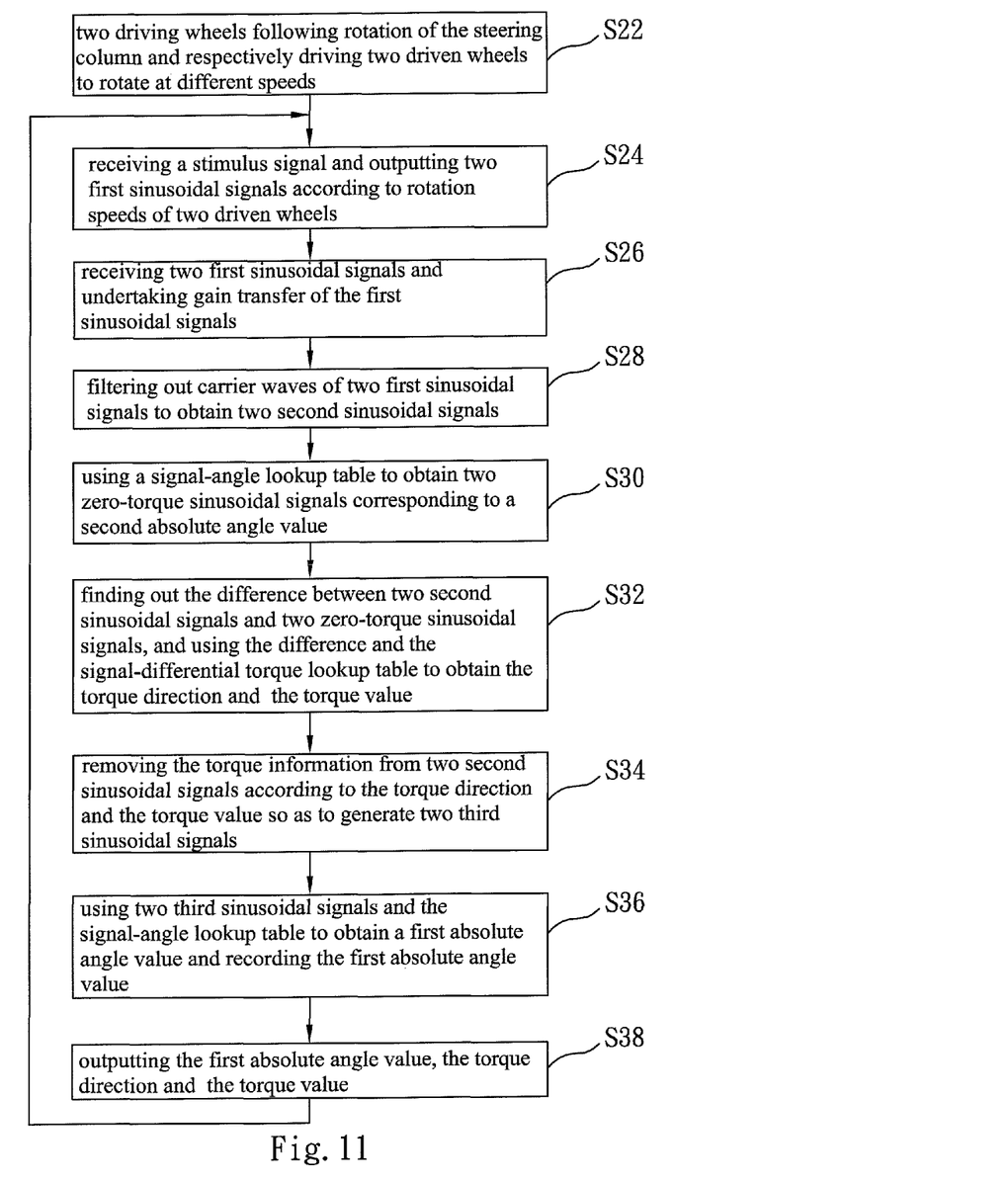
FIG. 11 shows the flowchart of a stimulus-based steering sensing method according to the second embodiment of the present invention.

Below is introduced a stimulus-based steering sensing method according to the second embodiment of the present invention. Refer to FIG. 2, FIG. 8 and FIG. 11. In Step S22, two driving wheels 10 follow the rotation of a steering column 12 and respectively drive two driven wheels 16 to rotate at different speeds. Next, in Step S24, a stator 20 of two resolvers 18 receives a stimulus signal and outputs two first sinusoidal signals according to the electromagnetic inductions, which are generated by two rotators 22 respectively following the rotations of two driven wheels 16. Next, in Step S26, a first amplifier 28 and a second amplifier 30 respectively receive two first sinusoidal signals, undertake gain transfer of the first sinusoidal signals, and output the scaled first sinusoidal signals to a microcontroller 24. Next, in Step S28, the microcontroller 24 filters out the carrier waves of two first sinusoidal signals and obtains two second sinusoidal signals. Next, in Step S30, the microcontroller 24 uses a signal-angle lookup table to obtain two zero-torque sinusoidal signals corresponding to a preset value functioning as a second absolute angle value. Next, in Step S32, the microcontroller 24 finds out the difference between two second sinusoidal signals and two zero-torque sinusoidal signals, and uses the difference and the signal-differential torque lookup table to obtain the value and direction of the torque. Next, in Step S34, the microcontroller 24 removes the torque information from two second sinusoidal signals according to the direction and value of the torque so as to generate two torque-free third sinusoidal signals. Next, in Step S36, the microcontroller 24 uses two third sinusoidal signals and the signal-angle lookup table to obtain a first absolute angle value and records the first absolute angle value. Next, in Step S38, an output unit 32 outputs the first absolute angle value, the direction and value of the torque. Then, the process returns to Step S24. Hereafter, the second absolute angle value used in Step S30 is no more the preset value but the first absolute value recorded latest.

In one embodiment, it is alternatively undertaken in Step S26 and Step S28 that the processor 14 directly receives and analyzes two first sinusoidal signals to obtain two second sinusoidal signals respectively having different periods. In one embodiment, Steps S30-S36 are replaced by a step: the processor 14 directly uses the second sinusoidal signals, the signal-angle lookup table, and the signal-differential torque lookup table to obtain the first absolute angle value, the direction and value of the torque.

Figure 12:
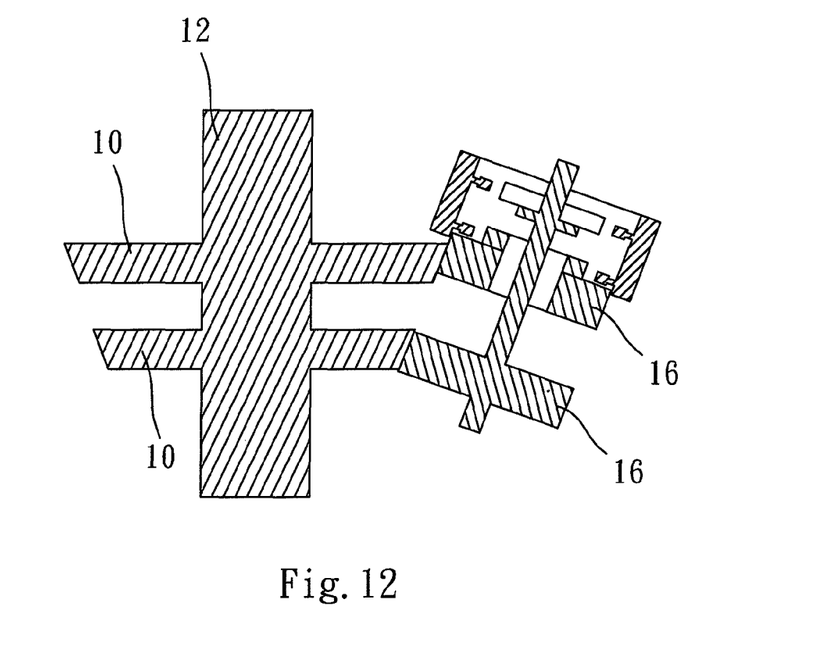
FIG. 12 schematically shows the structure of two driving wheels and two driven wheels, which all have inclined faces, according to the second embodiment of the present invention.
Figure 13:
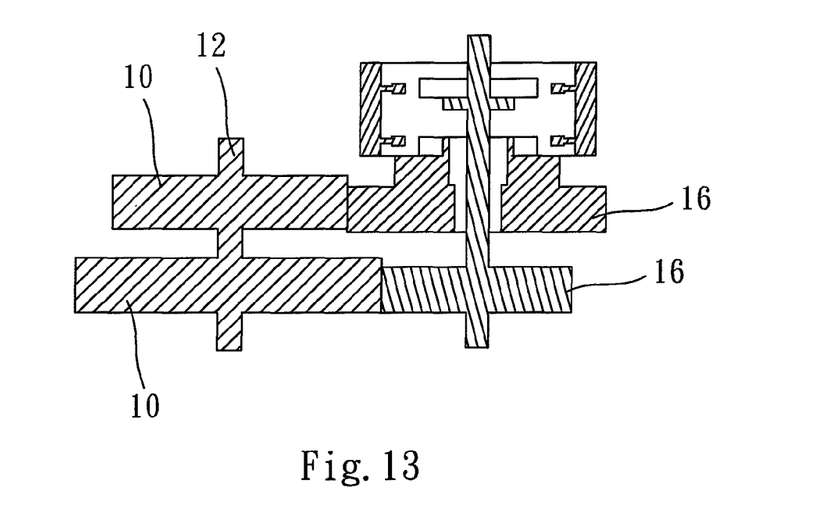
FIG. 13 schematically shows the structure of two driving wheels and two driven wheels, which all have vertical faces, according to the second embodiment of the present invention.
Figure 14:
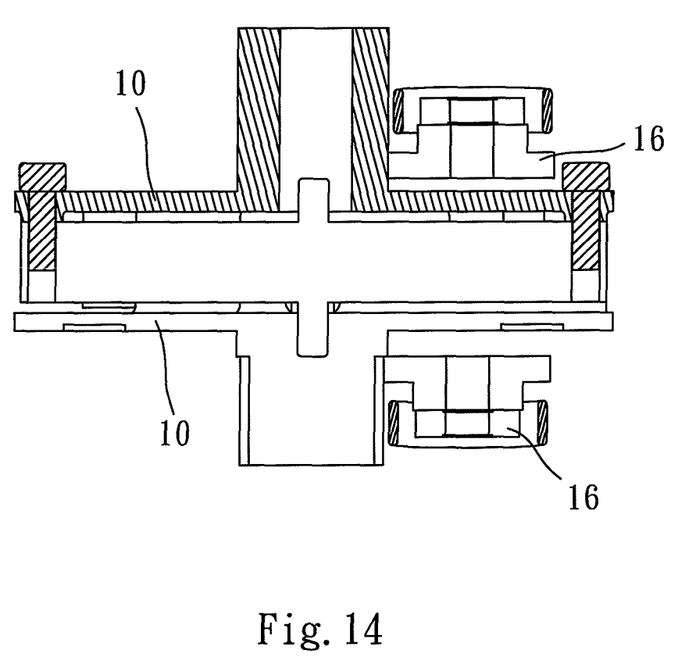
FIG. 14 schematically shows the structure of two driving wheels and two driven wheels, which are in form of planar wheels, according to the second embodiment of the present invention.

In the second embodiment, two driving wheels 10 and two driven wheels 16 may be gears, friction wheels, or planar wheels. When the driving wheels 10 and two driven wheels 16 are gears, the tooth faces of the driving wheels 10, which respectively contact driven wheels 16, have different numbers of teeth. As shown in FIG. 12 and FIG. 13, in the driving wheel 10, the tooth face having a greater diameter has more teeth, and the tooth face having a smaller diameter has less teeth. Thus, two driven wheels 16 rotate at different speeds. In FIG. 12, tooth faces of the driving wheels 10 are inclined faces. In FIG. 13, tooth faces of the driving wheels 10 are vertical faces. When the driving wheels 10 and two driven wheels 16 are friction wheels, the driven wheels 16 respectively have different diameter ratios with respect to the driving wheels 10 and thus rotate at different speeds. When the driving wheels 10 and two driven wheels 16 are planar wheels, two driven wheels 16 respectively contact the driving wheels 10 at different positions with different distances to the central axis of the driving wheels 10, as shown in FIG. 14. Thus, two driven wheels 16 respectively rotate at different speeds.

In conclusion, the present invention can easily measure a torque or a multi-revolution angle, using one or two driving wheels to drive two driven wheels to rotate at different speeds. The present invention is applicable to an EPS system.

The embodiments described above are only to exemplify the present invention but not to limit the scope of the present invention. Any equivalent modification or variation according to any one of the shapes, structures, characteristics and spirits disclosed in the present invention is to be also included within the scope of the present invention.

What is claimed is:

1. A stimulus-based steering sensor device comprising
   at least one driving wheel installed on a steering column of a steering wheel;
   a processor generating a stimulus signal and having a built-in signal-angle lookup table;
   two driven wheels contacting said driving wheel and driven by said driving wheel to rotate at different speeds when said driving wheel follows rotation of said steering column; and
   two resolvers connecting with said processor, respectively engaging with said two driven wheels, receiving said stimulus signal, and outputting two first sinusoidal signals to said processor according to rotations speeds of said two driven wheels, whereafter said processor analyzes said two first sinusoidal signals to obtain two second sinusoidal signals having different periods, and uses said two second sinusoidal signals, said signal-angle lookup table to obtain a first absolute angle value of rotation of said steering wheel.

2. The stimulus-based steering sensor device according to claim 1, wherein said two resolvers include
   at least one stator; and
   two rotators positioned between a primary side and a secondary side of said stator, respectively engaging with said two driven wheels, and driven to rotate by said two driven wheels, wherein said stator receives said stimulus signal and outputs said two first sinusoidal signals according to electromagnetic inductions generated by said two rotators following rotation of said two driven wheels.

3. The stimulus-based steering sensor device according to claim 1, wherein said processor includes
   a microcontroller storing said signal-angle lookup table and generating a PWM (Pulse Width Modulation) signal;
   a filter-amplifier connecting with said microcontroller and said two resolvers, receiving said PWM signal, filtering and amplifying said PWM signal to output said stimulus signal; and
   a first amplifier and a second amplifier connecting with said microcontroller and said two resolvers, respectively receiving said two first sinusoidal signals, undertaking gain transfer of said two first sinusoidal signals, and outputting said two first sinusoidal signals having been scaled to said microcontroller, wherein said microcontroller filters out carrier waves of said two first sinusoidal signals to obtain said two second sinusoidal signals, and uses said two second sinusoidal signals and said signal-angle lookup table to obtain said first absolute angle value.

4. The stimulus-based steering sensor device according to claim 1, wherein said driving wheel, said processor, said two driven wheels and said two resolvers form a modularized structure, and wherein said at least one driving wheel has two half-wheels installed on said steering column and engaging with each other and said steering column positioned between said two half-wheels.

5. The stimulus-based steering sensor device according to claim 1 further comprising an output unit outputting said first absolute angle value, and wherein said output unit is CAN (Controller Area Network), an analog output module, UART (Universal Asynchronous Receiver/Transmitter), or a serial bus interface, and wherein said serial bus interface is SPI (Serial Peripheral Interface) or I²C (Inter-Integrated Circuit).

6. The stimulus-based steering sensor device according to claim 1, wherein said at least one driving wheel is two driving wheels, and wherein said two driving wheels respectively contacting said two driven wheels, and wherein said processor further has a signal-differential torque lookup table, and wherein said processor uses said second sinusoidal signals, said signal-angle lookup table and said signal-differential torque lookup table to obtain said first absolute angle value, a torque direction and a torque value of rotation of said steering wheel.

7. The stimulus-based steering sensor device according to claim 6, wherein said processor uses said signal-angle lookup table to obtain two zero-torque sinusoidal signals corresponding to a second absolute angle value, finds out difference between said two zero-torque sinusoidal signals and said two second sinusoidal signals, uses said difference and said signal-differential torque lookup table to obtain said torque direction and said torque value.

8. The stimulus-based steering sensor device according to claim 6, wherein said processor removes torque information from said two second sinusoidal signals to obtain two torque-free third sinusoidal signals, and wherein said processor uses said two third sinusoidal signals and said signal-angle lookup table to obtain said first absolute angle value and records said first absolute angle value, and wherein said second absolute angle value is a preset value or said first absolute angle value having been recorded by said processor.

9. The stimulus-based steering sensor device according to claim 1, wherein said at least one driving wheel and said two driven wheels are planar wheels, friction wheels or gears, and wherein when said at least one driving wheel and said two driven wheels are planar wheels, said two driven wheels respectively contact said driving wheel at different positions with different distances to a center of said driving wheel and respectively rotate at different speeds, and wherein when said at least one driving wheels and said two driven wheels are friction wheels, said driven wheels respectively have different diameter ratios with respect to said at least one driving wheels and respectively rotate at different speeds, and wherein when said at least one driving wheels and said two driven wheels are gears, said driven wheels respectively have different gear ratios with respect to said at least one driving wheels and respectively rotate at different speeds.

10. The stimulus-based steering sensor device according to claim 6, wherein said at least one driving wheel and said two driven wheels are planar wheels, friction wheels or gears, and wherein when said at least one driving wheel and said two driven wheels are planar wheels, said two driven wheels respectively contact said driving wheel at different positions with different distances to a center of said driving wheel and respectively rotate at different speeds, and wherein when said at least one driving wheels and said two driven wheels are friction wheels, said driven wheels respectively have different diameter ratios with respect to said at least one driving wheels and respectively rotate at different speeds, and wherein when said at least one driving wheels and said two driven wheels are gears, said driven wheels respectively have different gear ratios with respect to said at least one driving wheels and respectively rotate at different speeds.

11. A stimulus-based steering sensing method, wherein at least one driving wheel, which is installed on a steering column of a steering wheel, contacts two driven wheels, said stimulus-based steering sensing method comprising steps:
said at least one driving wheel follows rotation of said steering wheel, driving said two driven wheels to rotate at different speeds;
receiving a stimulus signal and outputting two first sinusoidal signals according to rotational speeds of said two driven wheels;
receiving and analyzing said two first sinusoidal signals to obtain two second sinusoidal signals respectively having different periods;
using said two second sinusoidal signals and a signal-angle lookup table to obtain a first absolute angle value of rotation of said steering wheel; and
outputting said first absolute angle value.

12. The stimulus-based steering sensing method according to claim 11, wherein said step of receiving and analyzing said two first sinusoidal signals to obtain said two second sinusoidal signals further comprises steps:
receiving said two first sinusoidal signals and undertaking gain transfer of said first sinusoidal signals; and
filtering out carrier waves of said two first sinusoidal signals to obtain said two second sinusoidal signals.

13. The stimulus-based steering sensing method according to claim 11, wherein at least one driving wheel is two driving wheels, which are installed on said steering column of said steering wheel and respectively contact said two driven wheels, and wherein in said step of using said two second sinusoidal signals and a signal-angle lookup table to obtain said first absolute angle value, said two second sinusoidal signals, said signal-angle lookup table, and a signal-differential torque lookup table are used to obtain said first absolute angle value, a torque direction and a torque value of rotation of said steering wheel.

14. The stimulus-based steering sensing method according to claim 13, wherein in said step of outputting said first absolute angle value, said first absolute angle value, said torque direction and said torque value are output.

15. The stimulus-based steering sensing method according to claim 14, wherein said step of using said two second sinusoidal signals, said signal-angle lookup table, and said signal-differential torque lookup table to obtain said first absolute angle value, said torque direction and said torque value further comprises steps:
using said signal-angle lookup table to obtain two zero-torque sinusoidal signals corresponding to a second absolute angle value;
finding out difference between said two second sinusoidal signals and said two zero-torque sinusoidal signals, and using said difference and said signal-differential torque lookup table to obtain said torque direction and said torque value;
removing torque information from said two second sinusoidal signals according to said torque direction and said torque value so as to generate two third sinusoidal signals; and
using said two third sinusoidal signals and said signal-angle lookup table to obtain said first absolute angle value and recording said first absolute angle value.

16. The stimulus-based steering sensing method according to claim 15, wherein said second absolute angle value is said first absolute angle value recorded latest or a preset value.

* * * * *